Sept. 12, 1950        A. G. ENOCK        2,522,438
MACHINE FOR PRODUCING CAPS FOR MILK AND
OTHER BOTTLES AND SIMILAR CONTAINERS
Filed May 14, 1946        4 Sheets-Sheet 1
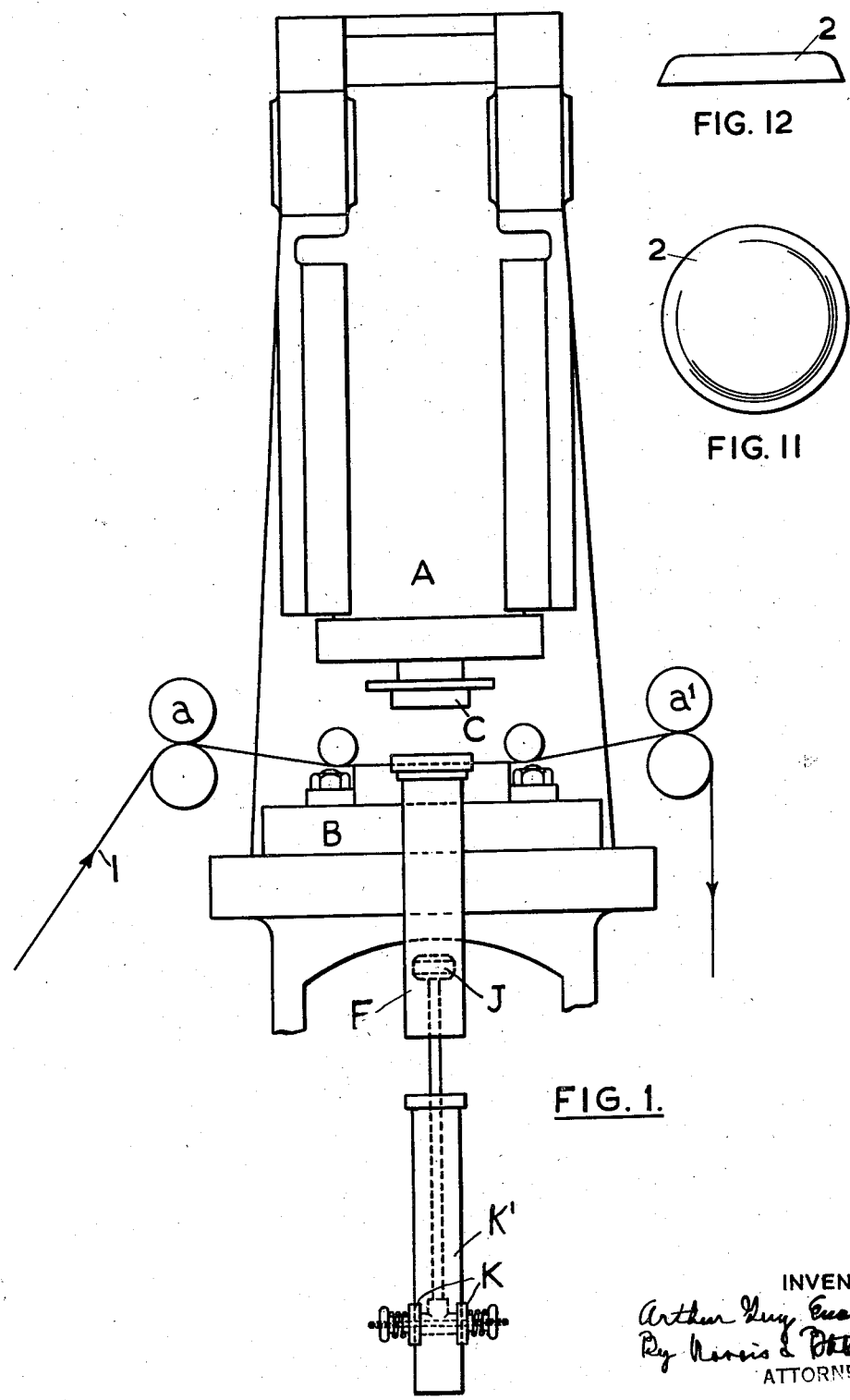

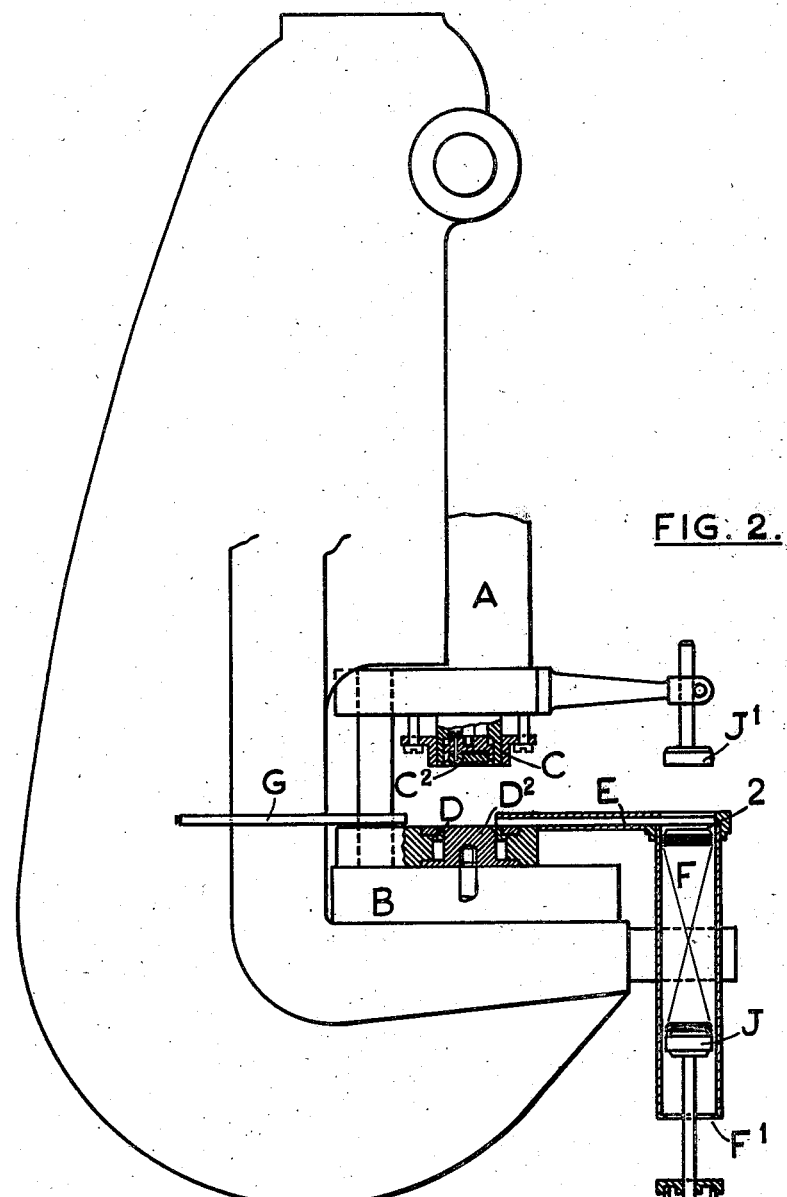

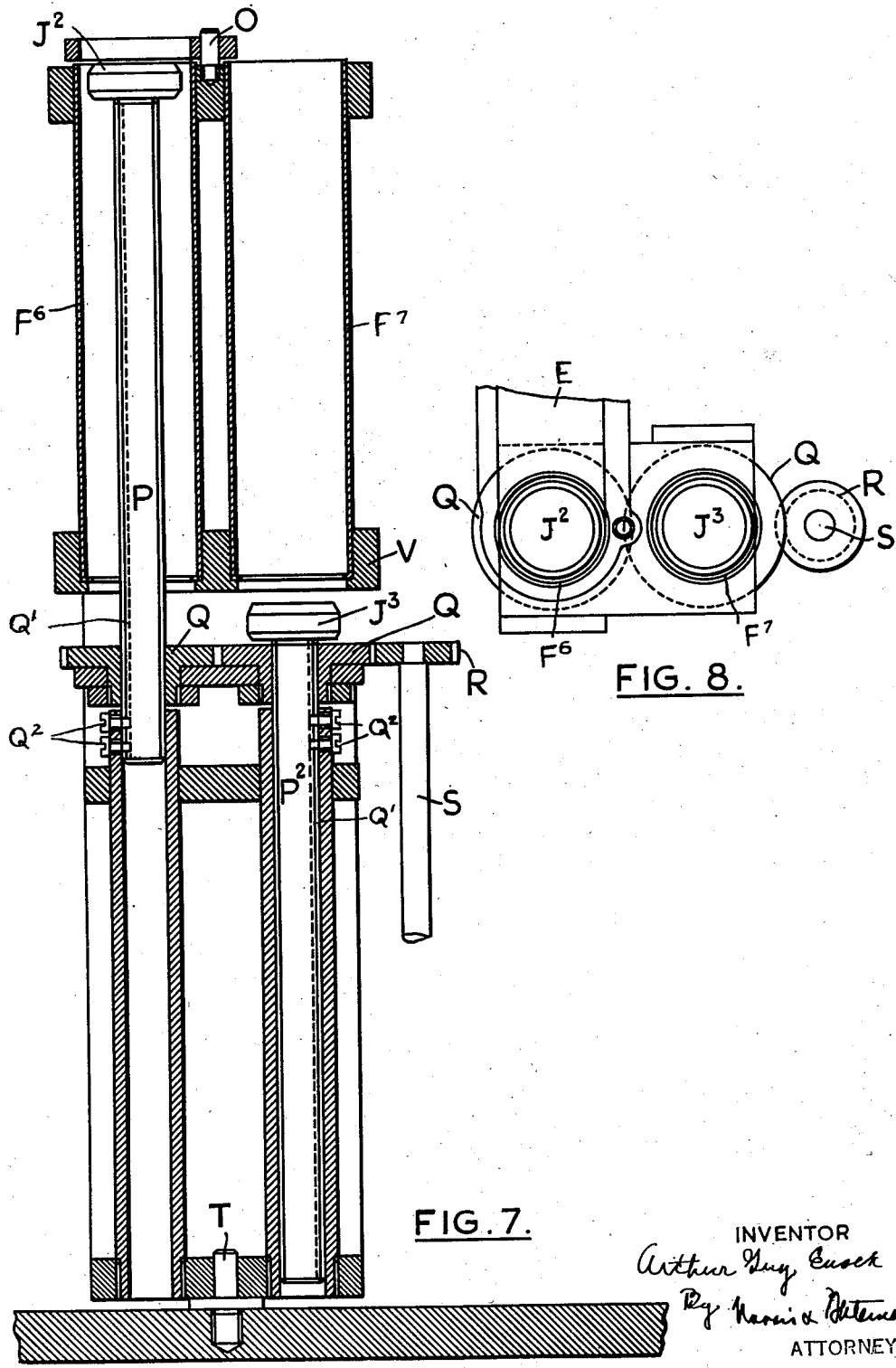

Sept. 12, 1950

A. G. ENOCK 2,522,438

MACHINE FOR PRODUCING CAPS FOR MILK AND
OTHER BOTTLES AND SIMILAR CONTAINERS

Filed May 14, 1946

INVENTOR
Arthur Guy Enock
By
ATTORNEYS

Patented Sept. 12, 1950

2,522,438

UNITED STATES PATENT OFFICE 2,522,438

MACHINE FOR PRODUCING CAPS FOR MILK AND OTHER BOTTLES AND SIMILAR CONTAINERS

Arthur Guy Enock, Thame, England

Application May 14, 1946, Serial No. 669,716
In Great Britain May 20, 1945

4 Claims. (Cl. 93—1.3)

This invention relates to improvements in machines for making caps for sealing milk or other bottles and like containers.

Cap making machines particularly for milk bottles are usually combined with the capping machine which applies the caps to the bottles as they come from the filling machine and any interruption of the capping plant causes the cutting off of the milk flow, stoppage of the filling, washing and pasteurising plant and the general holding up of the dairy routine. Such interruption of the capping plant is liable to occur as the result of dull dies, breakage of the capping strip, failure of a cap to be ejected properly or the delivery of more than one cap at a time, and stoppage also occurs when a reel of the foil or other material from which the caps are made becomes exhausted and has to be replaced.

The object of the present invention is to separate entirely the cap making mechanism from the capping mechanism so that the caps can be made in a separate machine which can be located away from the milk bottling plant and operated by labour of a more skilled type than is usually employed to attend to a milk bottling plant, the cap making machine however delivering the caps in a container or magazine which can be detached from the machine and transported to the capping machine and from which the caps can be supplied directly to the capping machine. By this means a supply of caps can always be available for the capping machine as the cap making machine can work in advance of the latter.

According to the present invention the cap making machine comprises a press with punching, forming and embossing dies fitted with means to deliver the caps as they are formed into a magazine in which they are stacked one upon another either vertically or at an inclination to the vertical, the skirt of the caps being formed at a suitable angle to the surface thereof to enable the caps to be compactly stacked in the magazine.

The invention will be described with reference to the accompanying drawings:

Fig. 1 is a front elevation of the machine showing a cap making strip fed by rolls between a punch and die with the waste or skeleton removed by other rolls;

Fig. 2 is a side elevation of same partly in section through the cap passage and magazine;

Figs. 3 to 6 show various cross sections for the magazine;

Fig. 7 is an elevation of an alternative form of double magazine;

Fig. 8 is a plan of same;

Fig. 11 is a top plan view and Fig. 12 is a side elevation of a cap made by a machine according to the present invention.

As shown in Figs. 1 and 2 the cap making strip I is fed to the cap forming machine by a pair of feed rollers $a$ the cap blank being punched out of the strip by punch C operating in conjunction with a press ram A and bolster B. The cap blank is simultaneously pressed to shape by a hollow former $C^2$, die D and convex former $D^2$, to form a cap 2 having an outwardly flared skirt, the junction between the skirt and the top of the cap being rounded to avoid splitting during application of the cap to the bottle. The waste or skeleton of the strip I is removed from the machine by rollers $a^1$.

The cap 2, after being formed and the ram A has been raised, is blown along a passage E, by a jet of compressed air issuing from a pipe G, to a magazine F.

The magazine may be of various cross sections as shown in Figs. 3 to 6 and provided with means for allowing air to escape along the sides as the cap descends. Holes or slots $f^2$ may be provided in a circular magazine $F^2$ for the escape of the air (Fig. 3) or the magazine may be a square tube $F^3$ (Fig. 4) or an angular tube $F^4$ (Fig. 5) or a round tube $F^5$ (Fig. 6) with inwardly projecting beads $f$, to allow the air to escape past the edges of the caps at $f^3$, $f^4$ and $f^5$ respectively.

The magazine F as shown in Figs. 1 and 2 is provided with a sliding plunger J to receive the caps 2 and which may be supported by friction pads K attached to the lower end of the plunger J and spring-pressed against the opposite outer sides of a tube K' mounted in a fixed position below the cap magazine F. The caps are pushed downward by the action of a second plunger $J^1$ mounted on the ram A, which presses upon the upper face of the pile of caps 2 as they accumulate in the magazine.

The magazine F is provided with an internal rim or flange $F^1$ upon which the pile of caps 2 rests as the plunger leaves the magazine at the bottom.

Alternatively two spindles P, $P^2$ of plungers $J^2$, $J^3$ may be threaded and provided with spline grooves Q' and keys $Q^2$ cooperating therewith to prevent rotation but permit vertical movement of the spindles, as shown in Fig. 7 and geared die nuts Q rotated by a gear wheel R and driven from the press mechanism by a spindle S cooperate with the respective threaded spindles, thus steadily lowering the plunger J² in one magazine F⁶ at the required speed, to receive the pile of caps 2 as it builds up from the press. Simultaneously the plunger J³ in the other magazine F⁷ is raised. When the first named plunger J² is at the bottom the other plunger J³ reaches the top and the magazines F⁶ and F⁷ are swivelled a half turn on pivots T and O, the full one being replaced by an empty one and the machine again started. The magazines may be held in place by means of clips V or they may be inserted in a recess at the bottom of the cap passage.

Figure 9:
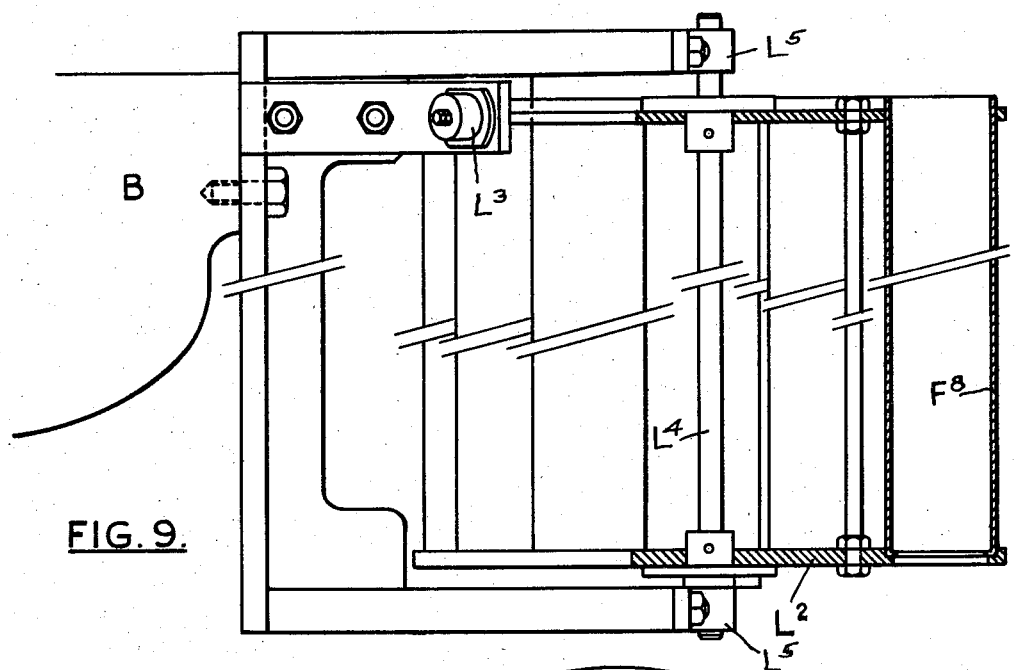
Fig. 9 is an elevation of a further arrangement of magazine.
Figure 10:
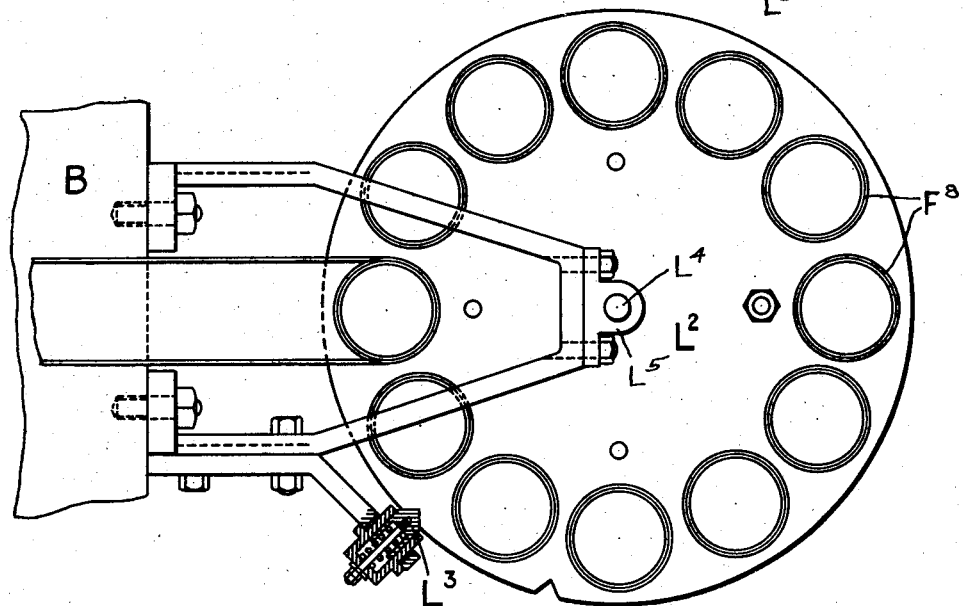
Fig. 10 is a plan of same.

Another arrangement for receiving the caps comprises a series of magazines F⁸ in Fig. 9 set in a revolving cage L² fixed to the front of the press bolster B and carried by a shaft L⁴ journaled in bearings L⁵. When one magazine is full the cage L² is rotated through 30° and the next empty magazine receives the caps 2, the others following in turn until all magazines are full, when they are withdrawn and replaced by empties. Magazines are positioned under the cap passage by spring stop L³.

I claim:

1. A machine for producing caps for sealing milk or other bottles comprising a press, feed rollers for supplying strip material thereto and delivery rollers for removing the skeleton strip therefrom, a delivering chute along which the formed caps pass, a compressed air supply pipe for traversing the caps along the chute, a pair of magazines to receive the caps in turn, a stacking plunger in each magazine and gearing driven by the machine whereby one plunger rises as the other is lowered and means for swivelling the magazines at the end of each stroke of the plungers.

2. A machine for producing caps for sealing milk or other bottles comprising a press, feed rollers for supplying strip material thereto and delivery rollers for removing the skeleton strip therefrom, a delivering chute along which the formed caps pass, a compressed air supply pipe for traversing the caps along the chute, a plurality of radially arranged magazines to receive the caps in turn, a rotary cage in which the magazines are mounted, means for rotating the cage through a predetermined angle when one magazine is full to bring the next into position and a spring stop to locate each magazine in turn to receive caps from the chute.

3. A machine for producing skirted caps for sealing milk or other bottles, comprising a press having a die and convex former and a reciprocatory ram carrying a punch and hollow former cooperative with said die and convex former, means for feeding a strip of material to the press transversely across said die and convex former and for removing from the press the skeleton strip from which the caps are punched, a chute having an entrance adjacent to and at one side of said die and convex former and extending laterally therefrom in a direction transverse to the direction of feed of the strip, a compressed air supply pipe positioned at the side of the die and convex former opposite to that at which the entrance of the chute is located and alined with the chute and directed longitudinally thereof for transferring caps from the die and convex former to the chute and for traversing them longitudinally along the chute, the chute being provided toward its outer end with a discharge opening through which the caps fall by gravity, a magazine positioned below the chute to receive caps therefrom, and a stacking plunger in the magazine upon which the caps fall.

4. A machine for producing caps for sealing milk or other bottles, comprising a press having a reciprocatory cap punching and forming member, means for supplying a strip of material to the press and for removing the skeleton strip therefrom, a delivery chute extending laterally of the press and along which the formed caps pass, a compressed air supply pipe at one end of the chute and directed longitudinally thereof for traversing the caps along the chute, a vertical magazine having an open upper end to receive the caps by gravity from the chute and having means to allow for the escape of air from the magazine, a stacking plunger in the magazine upon which the caps fall, means including friction pads cooperating with the stacking plunger for frictionally resisting movement thereof, and a second plunger fixed to the cap punching and forming member to reciprocate in unison therewith and operative on caps in the magazine to gradually lower the stacking plunger and caps thereon against the frictional resistance of the friction pads as the magazine fills with caps.

ARTHUR GUY ENOCK.

REFERENCES CITED

The following references are of record in the file of this patent:

UNITED STATES PATENTS

| Number | Name | Date |
|---|---|---|
| 483,958 | Godfrey | Oct. 4, 1892 |
| 1,627,412 | Ruckert | May 3, 1927 |
| 1,661,248 | Barbieri | Mar. 6, 1928 |
| 1,965,274 | Zanetti | July 3, 1934 |